No. 786,547. PATENTED APR. 4, 1905.
H. G. CHAMBERLIN.
SHIPPING PACKAGE FOR POTTED PLANTS.
APPLICATION FILED JULY 1, 1904.
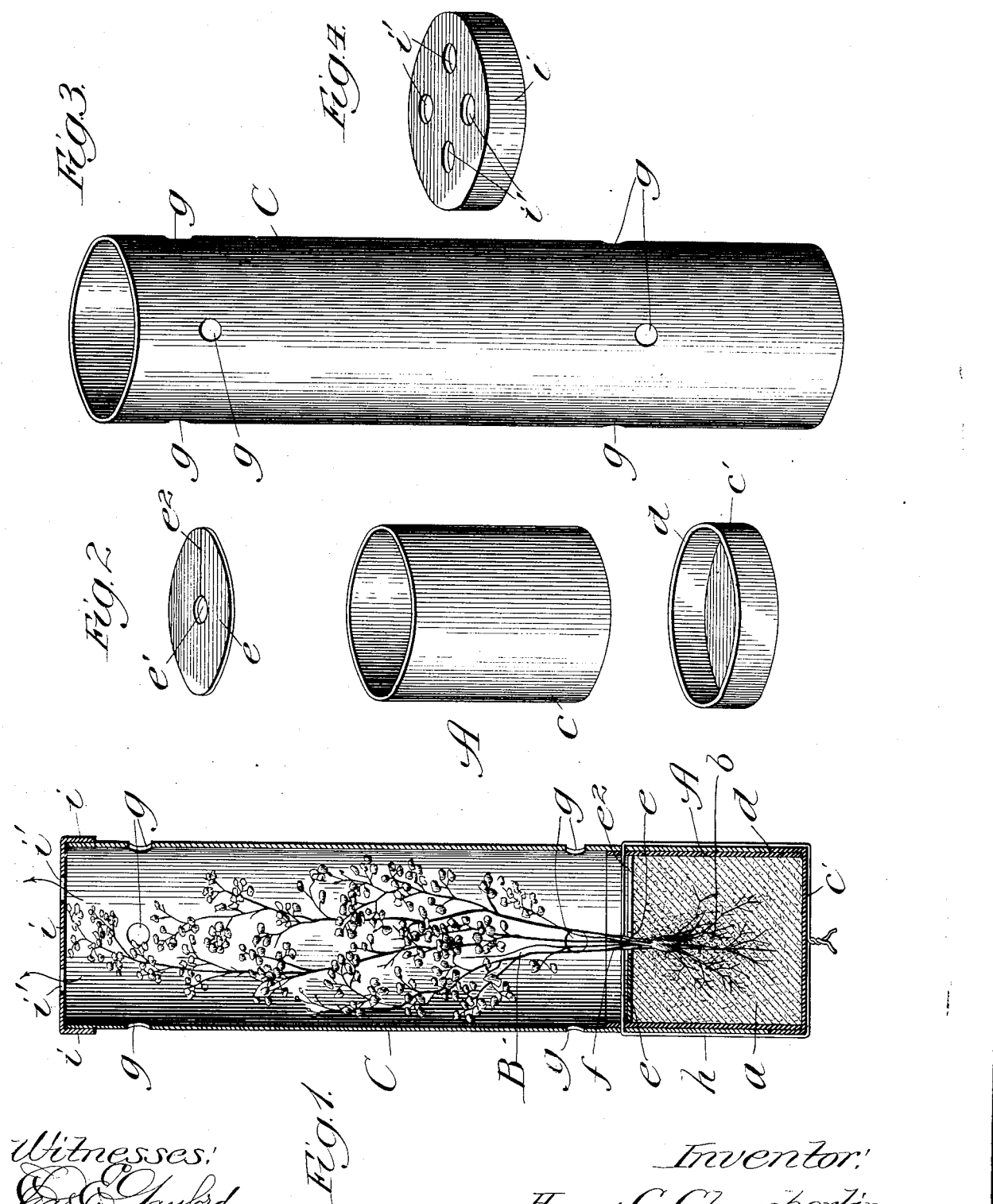
Witnesses:
Inventor:
Harry G. Chamberlin, No. 786,547. Patented April 4, 1905.

UNITED STATES PATENT OFFICE.

HARRY G. CHAMBERLIN, OF CHICAGO, ILLINOIS.

SHIPPING-PACKAGE FOR POTTED PLANTS.

SPECIFICATION forming part of Letters Patent No. 786,547, dated April 4, 1905.

Application filed July 1, 1904. Serial No. 214,907.

*To all whom it may concern:*

Be it known that I, HARRY G. CHAMBERLIN, a citizen of the United States, residing at Chicago, in the county of Cook and State of Illinois, have invented a new and useful Improvement in Shipping-Packages for Potted Plants, of which the following is a specification.

The shipment of potted plants to the trade even when the pots are formed of heavy paper, as they sometimes are, is attended with so much risk of injury to them by disturbance of the soil embedding the roots and consequent harm to the latter and by impairment of the foliage that great care is usual in packing them for and handling them in transportation, necessitating limitation of each package to comparatively few plants and rendering the matter of transportation accordingly expensive.

The object of my invention is to provide an inexpensive construction of package for shipping a potted plant which shall be susceptible of ready and convenient use and shall afford such protection to the roots and foliage of the plant as to adapt it to be shipped by mail, express, or freight without danger of injury, the construction adapting any number of the packages to be packed together without risk of injury to the plants in them in transportation.

Referring to the accompanying drawings, Figure 1 shows my improved package by a view in vertical sectional elevation with the pot of a preferred but not essential variety and form. Fig. 2 shows the pot-base, the pot, and its cover in perspective separate and one above the other. Fig. 3 is a perspective view of the tubular shield for the foliage of a plant, and Fig. 4 is a perspective view of the covering-cap.

A is a flower-pot containing the soil $a$, in which are embedded the roots $b$ of a plant B, such as a fern. The pot shown is formed of heavy paper or pasteboard, and its shape is cylindrical, though it may be composed of earthenware, metal, or any other suitable material, and it may be of the more common tapering or other form. When plants are furnished to the trade in paper pots, the retail purchaser from a dealer of a plant may take it home in the package and on removing the plant therefrom readily transfer it, with the soil about its roots, to an earthenware pot. The paper pot illustrated is closed by a base-cap $c'$, surrounded and cemented about the lower end of the cylindrical body $c$ to afford an annular shoulder $d$ for the purpose hereinafter explained.

An important feature of my improvement is the flexible pot-cover $e$, of any suitable material, but preferably of pasteboard, having a central opening $e'$ split to form a slit $e^2$, extending from the opening to the outer edge of the cover. The cover fits inside the pot over and against the surface of the soil therein, being applied by spreading it apart at the slot to adapt it to be adjusted across the plant-stem, which thus becomes encircled by the opening $e'$.

C is a tubular shield formed, preferably, of pasteboard, though it may be metal, wood, or any other suitable material, and I prefer to provide it, as shown, with air-inlet openings $g$ to admit air to the plant, though they are not indispensable.

To form the package with the potted plant, a cover $e$ is adjusted in place and fastened in any suitable manner, but preferably as hereinafter described. Thereupon the tube is adjusted to surround and shield the stem and foliage. When the particular form of pot shown is employed, the tube is adjusted over the foliage and stem to meet the shoulder $d$ of the pot, and the shield and pot are separably fastened together, preferably by means of a securing medium such as a wire $h$ or the like, which is threaded transversely through the tube just above the plane of the top of the pot to one side of that of the stem and passed at its ends down along opposite sides of the tube and across the base of the pot, where the ends are twisted together to fasten them. This form of fastening is desirable because of its simplicity and because it performs the double purpose of holding the pot and shield together and securing the pot-cover $e$ in place, thus permitting the package to be handled with considerable roughness without impairing it or displacing the pot-cover, which therefore reliably holds the soil intact in its place.

If desired, though it is not necessary, a cap *i* may be provided to cover the top end of the shield C, and when used it may contain air-holes *i'* for ventilating the plant.

If the pot used be of smaller diameter than the tube C, it may be inserted base first from the upper end of the latter, thus introducing the stem and foliage last and without difficulty, and the wire *h* will serve to hold such a pot in place by passing across its base.

What I claim as new, and desire to secure by Letters Patent, is—

1. A shipping-package for potted plants, comprising, in combination, a stiff tube adapted to receive a potted plant, a flexible disk separate from and insertible into said tube and of a diameter adapting it to enter into the pot of a potted plant in said tube and contact with the surface of the soil in said pot, said disk having a central opening to surround the stem of the plant and a slit extending from said opening to the edge of the disk, and means for securing said disk in place, substantially as described.

2. A shipping-package for potted plants comprising, in combination, a stiff tube adapted to receive a potted plant, a flexible disk separate from and insertible into said tube and of a diameter adapting it to enter into the pot of a potted plant in said tube and contact with the surface of the soil in said pot, said disk having a central opening to surround the stem of the plant and a slit extending from said opening to the edge of the disk, and a fastening-strip passing transversely through said tube over said disk and affording means for securing the disk in place, substantially as described.

HARRY G. CHAMBERLIN.

In presence of—
A. U. THORIEN,
WALTER N. WINBERG.